No. 656,823. Patented Aug. 28, 1900.
R. H. LITTLE.
AIR OR GAS ENGINE.
(Application filed Oct. 9, 1899.)
(No Model.) 6 Sheets—Sheet 1.
Fig. I.
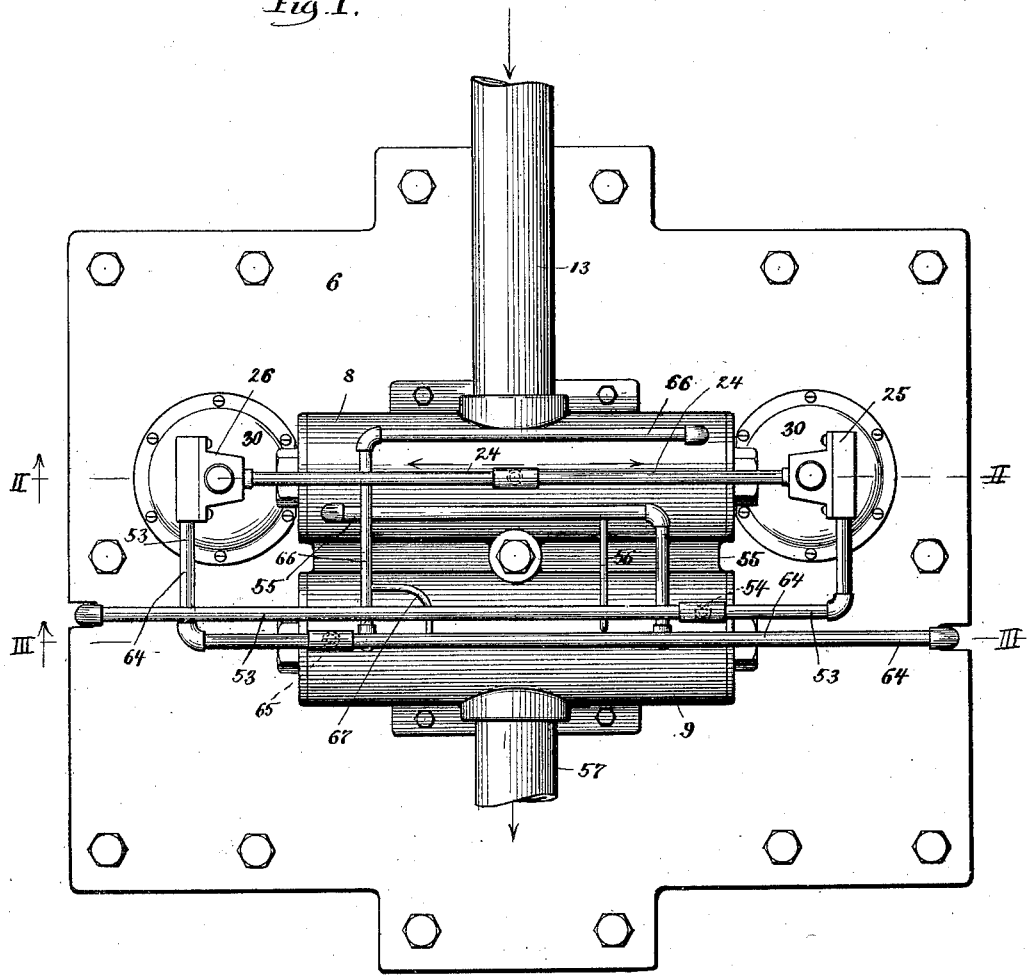
Witnesses:
Fred Gerbach
Katharine Gerbach.
Inventor:
R. H. Little
By Pain & John
his Attorneys.

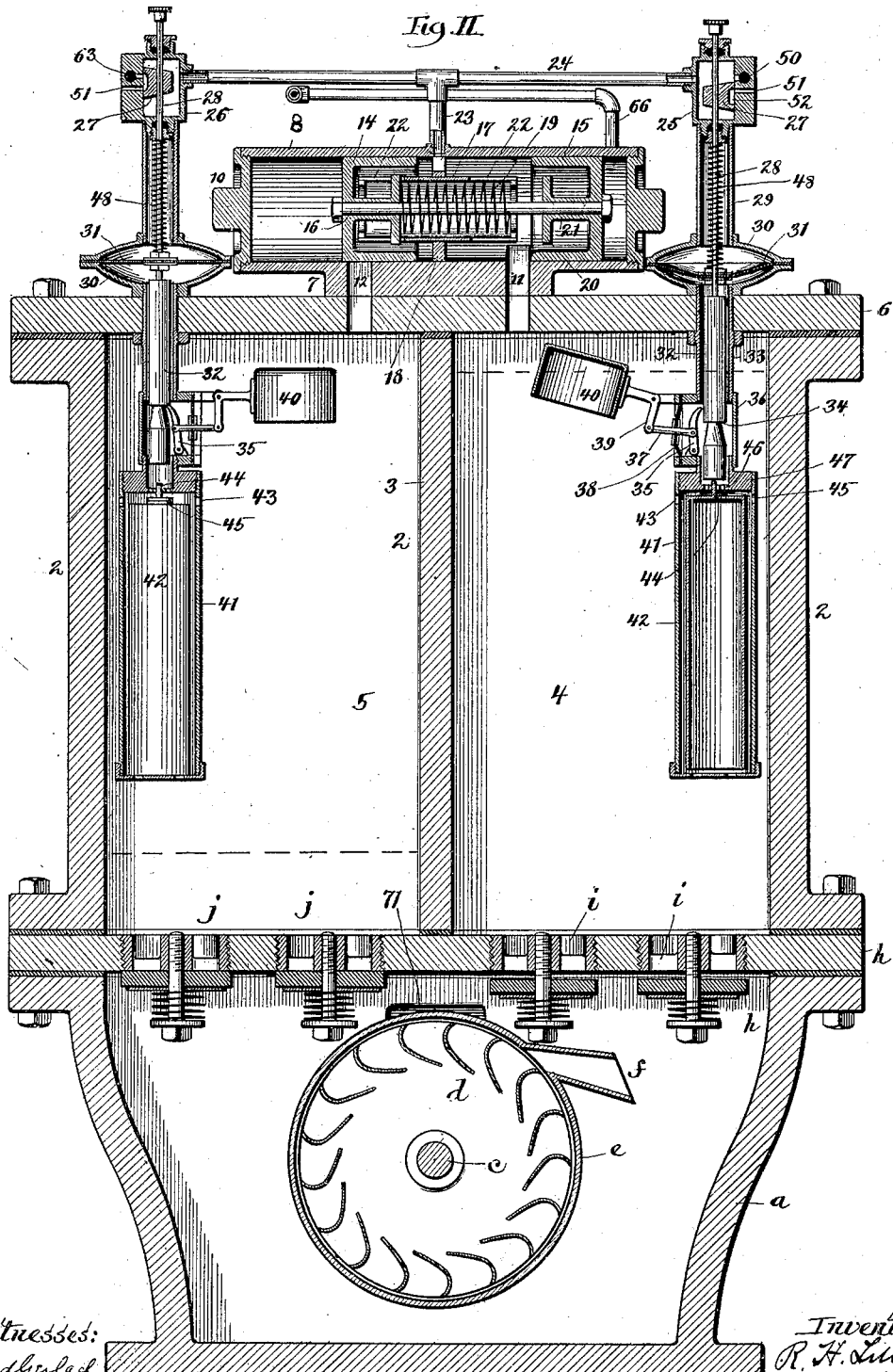

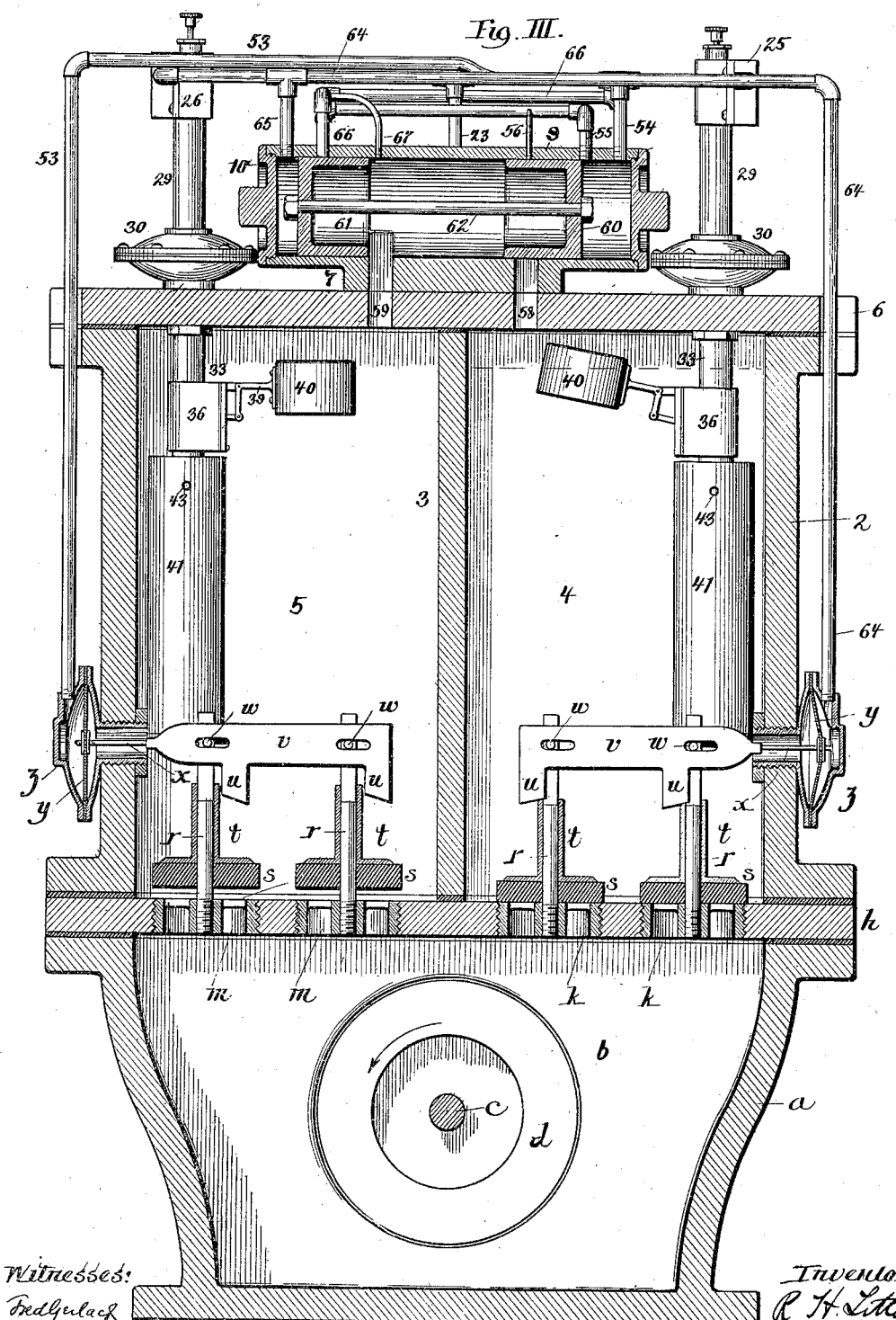

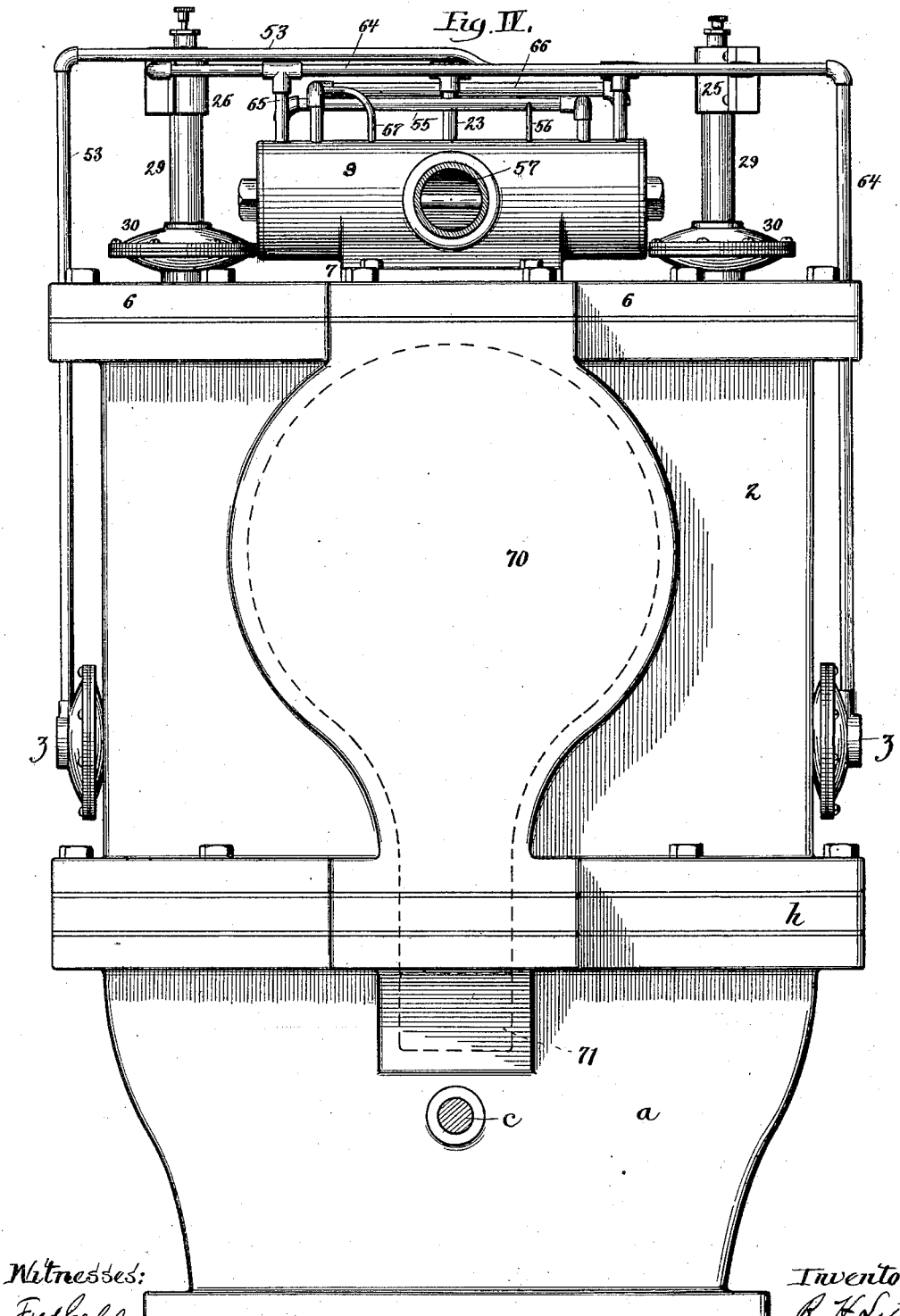

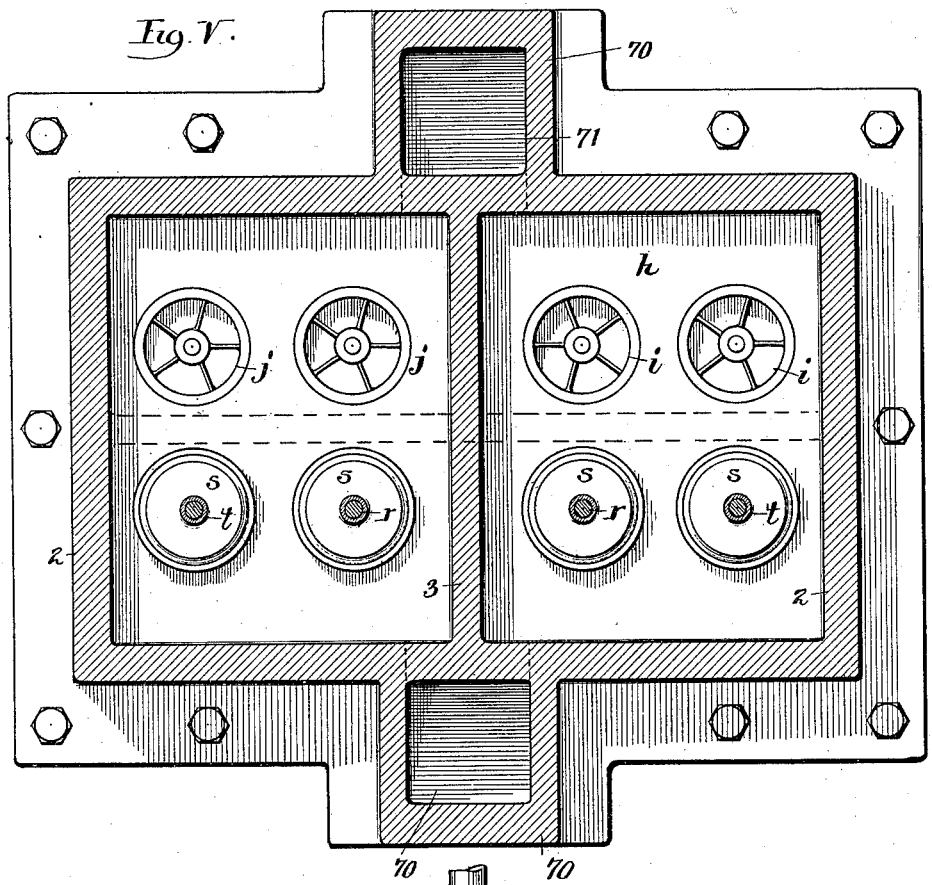
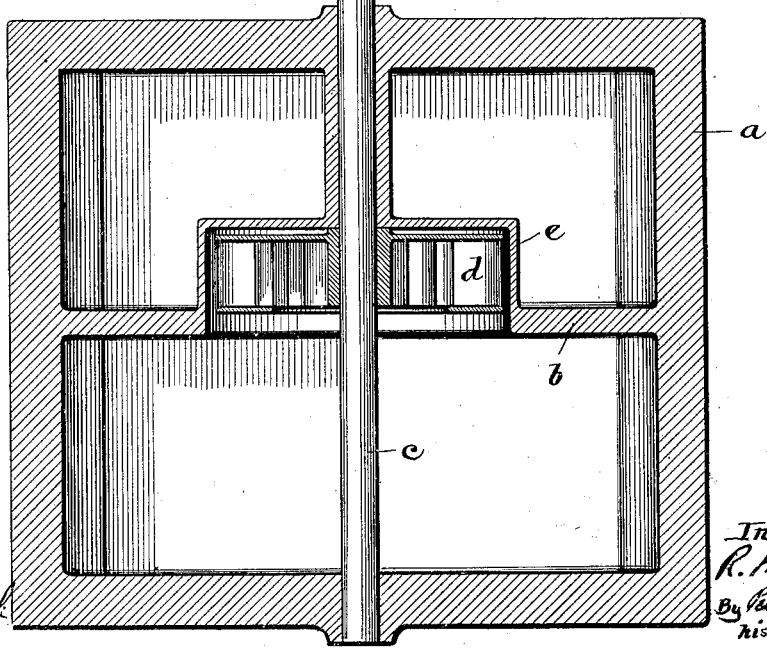

No. 656,823. Patented Aug. 28, 1900.
R. H. LITTLE.
AIR OR GAS ENGINE.
(Application filed Oct. 9, 1899.)
(No Model.) 6 Sheets—Sheet 6.
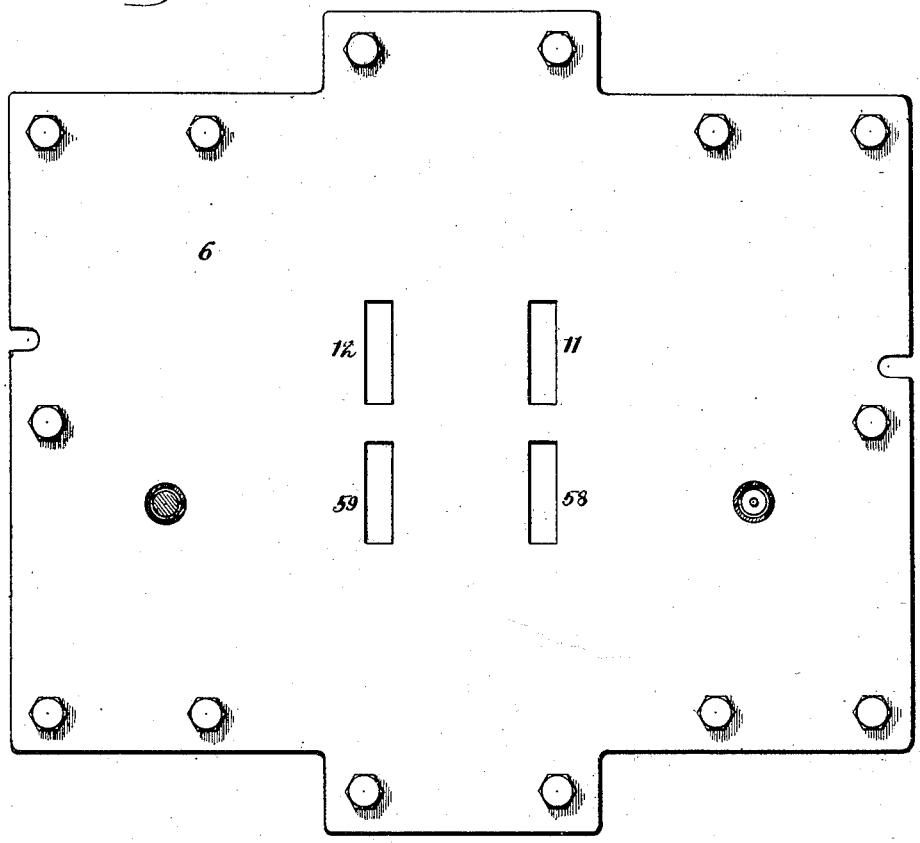
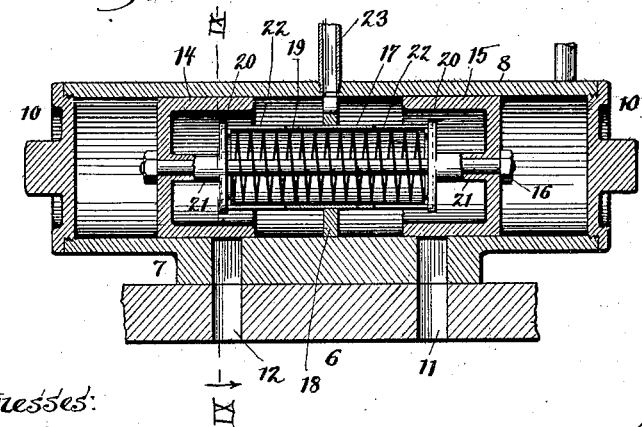
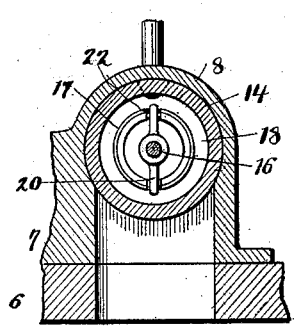

UNITED STATES PATENT OFFICE.

ROBERT H. LITTLE, OF CHICAGO, ILLINOIS, ASSIGNOR OF ONE-HALF TO SIMON W. STRAUS, OF SAME PLACE.

AIR OR GAS ENGINE.

SPECIFICATION forming part of Letters Patent No. 656,823, dated August 28, 1900.

Application filed October 9, 1899. Serial No. 732,992. (No model.)

*To all whom it may concern:*

Be it known that I, ROBERT H. LITTLE, a resident of Chicago, Cook county, Illinois, have invented certain new and useful Improvements in Air or Gas Engines, of which the following is a full, clear, and exact description.

The present invention has for its object to provide an improved construction of engine adapted to be operated by air or gas under pressure, the most characteristic feature of the invention being the employment of a body of liquid that will be operated upon by compressed air or gas and will serve to drive a suitable motor from which power will be transmitted to the mechanism to be driven.

The invention consists in the improvements hereinafter described, illustrated in the accompanying drawings, and particularly pointed out in the claims at the end of the specification.

Figure I is a plan view of an engine embodying my invention. Fig. II is a view in central vertical section on line II II of Fig. I. Fig. III is a view in vertical section on line III III of Fig. I. Fig. IV is a view in side elevation. Fig. V is a view in horizontal section above the flange of the central casing. Fig. VI is a view in horizontal section through the motor-chamber. Fig. VII is a plan view with the cylinders removed. Fig. VIII is a detail view, in vertical longitudinal section, through the inlet-cylinder and parts contained therein. Fig. IX is a view in cross-section on line IX IX of Fig. VIII.

In the embodiment of my invention illustrated in the accompanying drawings the main casing of the engine is shown as consisting of three main parts that are preferably formed of cast metal. The base or lowermost compartment $a$ is divided by a diaphragm $b$, and through this diaphragm, and as well also through the side wall of the base $a$, extends a shaft $c$, whereon is mounted a turbine or like wheel $d$. The shaft $c$ will be journaled in suitable bearings and a stuffing-box will be provided where the shaft passes through the wall of the casing $a$, and from the outer end of the shaft $c$ power will be taken by a suitable pulley or gear (not shown) to the engine to be driven. The wheel $d$, which for convenience will be termed the "power-wheel," is inclosed within a suitable casing $e$, that is cast with the diaphragm $b$, the upper part of the casing $e$ being furnished with an inlet pipe or chute $f$, by which water or like liquid will be delivered to the veins or buckets of the power-wheel $d$. A central opening is formed in the diaphragm $b$, and through this opening liquid will pass from the power-wheel $d$.

Over the top of the base $a$ is fitted a valve-plate $h$, wherein are formed the inlet and discharge ports, eight of such ports being shown in the accompanying drawings, although manifestly more or less ports may be used. The ports by which liquid passes down into the base or compartment $a$ are for convenience termed "discharge-ports," and the ports by which the liquid passes upward from the base or compartment $a$ to the compartment above it are for convenience termed "inlet-ports." The discharge-ports are designated upon the drawings by the reference-letters $i$ and $j$ and the inlet-ports are designated $k$ and $m$. Each of the discharge-ports $i$ and $j$ is fitted with a bushing, from the central hub of which extends a post $r$, upon which is mounted in manner free to slide the valve $s$. Each of the valves $s$ is shown as provided with a tubular stem $t$, extending upward into position to be engaged by the depending arms $u$ of the lock-plate $v$, this lock-plate being held in position and guided by pins $w$, that project from the upper ends of the posts $r$. (See Fig. III.) Each of the lock-plates $v$ is connected by a rod $x$ to a flexible diaphragm $y$, that is held within a casing $z$.

Upon the valve-plate $h$ rests the central or main casing 2, the construction of which is more particularly illustrated in Figs. II and V of the drawings. The main casing 2 is divided by a transverse diaphragm 3 into the compartments 4 and 5. The diaphragm 3 extends centrally across the casing 2, and consequently the bottom of each of the compartments 4 and 5 has therein two of the inlet-valves and two of the discharge-valves. The bottom of the main casing 2 is shown as provided with an outwardly-extending flange by which the main casing will be bolted to a corresponding flange formed around the top of the base $a$, the valve-plate $h$ being intermediate the base $a$ and the main casing 2. The upper end of the main casing 2 is also provided with a lateral flange, to which is bolted the top plate 6, whereon rests the valve-casing 7. The valve-casing 7 is preferably a single casting comprising the admission-cylinder 8 and the exhaust-cylinder 9, the ends of the cylinders being closed by caps 10, preferably screw-threaded thereto. The inlet-cylinder 8 is connected, respectively, by channels 11 and 12 with the compartments 4 and 5 of the main casing, and air or like fluid under pressure is supplied to the inlet-cylinder 8 by a main delivery-pipe 13. In the cylinder 8 are mounted the two pistons 14 and 15, that are connected together by the piston-rod 16, (see Fig. II,) that passes through a cylindrical casing 17, that is fastened to a transverse diaphragm 18 within the cylinder 8. The casing 17 has its ends provided with interior flanges or rims, against which normally bear the ends of a coil-spring 19, that encircles the rod 16. Adjacent each of the pistons 14 and 15 is arranged a pusher-bar 20, that is carried by a sleeve 21, encircling the rod 16, the ends of the pusher-bar entering slots 22, formed at the end of the casing 17. It will be seen that when the piston 14, for example, is moved in the manner hereinafter described the pusher-bar 20 will compress the coil-spring 19, the opposite end of the coil-spring resting against the inwardly-turned flange or rim at the opposite end of the casing 17, and the spring 19 will tend to restore the piston 14 to the normal position shown in Fig. VIII. The purpose of the coil-spring 19 will hereinafter more fully appear.

From the inlet-cylinder 8 rises an outlet-pipe 23, that is coupled to a pipe 24, (see Fig. I,) that extends across the top of the inlet-cylinder, the opposite ends of the pipe 24 being connected to the slide-valve chambers 25 and 26. (See Fig. II.) In the valve-chamber 25 is mounted a slide-valve 27, that is fixed to a rod 28, this rod extending through suitable glands or stuffing-boxes in the top and bottom of the chamber 25. The valve-chamber 25 is connected by a pipe 29 to a diaphragm-chamber 30, within which chamber is a diaphragm 31, that is fastened to the rod 28 and through which this rod passes. The lower end of the rod 28 is fastened to a plunger 32, that loosely sits within a sleeve or cylinder 33, that passes through a top plate 6 and down into the compartment 4 of the main casing. The lower part of the plunger 32 is formed with an annular shoulder 34, adapted to be engaged by a latch 35, that is pivotally connected to a frame or casing 36. To the latch 35 is connected one end of a rod 37, that extends through a flexible diaphragm 38, that closes an opening at one side of the casing 36, and the opposite end of the rod 37 is pivotally connected to an elbow-lever 39, that carries the float 40, this float being pivoted, as shown, to the upper part of the casing 36. The casing 36 is suspended from the lower end of the tube or sleeve 33, and to the bottom of the casing is connected the upper end of a float-casing 41, in which is contained the float 42. In the upper part of the float-casing 41 are formed one or more holes 43, and from the top of the float 42 extends a pin or stem 44, around which sits a valve 45, that is adapted to close the holes 46, that are formed in the top plate 47 of the float-casing 41. (See Fig. II.) Within the pipe 29 and sitting around the rod 28 is a coil-spring 48, that bears against the diaphragm 31 and tends to force the rod 28 and the slide-valve 27 downward when the pressure of air or like fluid is relieved below the diaphragm 31.

In the valve-seat of the casing 25 are formed a port 50 (see Fig. II) and an exhaust-passage 51. The passage 51 communicates with the outer air, and the port 50 and passage 51 are arranged in such relation to each other that they may be connected by the exhaust-cavity 52 of the slide-valve 27. With the port 50 connects a pipe 53, from which a branch-pipe 54 leads downward into one end of the exhaust-cylinder 9, and by reference to Figs. I and II it will be seen that this pipe 53 leads across the top of the engine and thence downward to the diaphragm-casing $z$. From one end of the exhaust-cylinder a pipe 55 leads to the opposite end of the inlet-cylinder 8, and a by-pass pipe 56 connects the pipe 55 with the exhaust-cylinder 9, as shown in Fig. III of the drawings. From the exhaust-cylinder 9 a main exhaust-pipe 57 leads to the atmosphere. The exhaust-cylinder 9 is connected, respectively, with the compartments 4 and 5 of the main casing by channels 58 and 59, and within the cylinder 9 are held the pistons 60 and 61, that are connected by the rod 62.

The general operation of the parts as thus far defined will be seen to be as follows, viz: Air or like fluid under pressure will be admitted from a storage-tank or other source of supply by inlet-pipe 13 to inlet-cylinder 8 and will pass upward from said cylinder by the outlet-pipe 23 and pipe 24 to slide-valve casing 25, (see Figs. II and III,) and thence by pipes 53 and 54 to the right-hand end of the exhaust-cylinder 9, (see Fig. I,) thereby forcing the piston 60 to uncover the port with which connects the pipe 55. Air will then pass from exhaust-cylinder 9 by pipe 55 to the left-hand side of the inlet-cylinder 8 (see Fig. II) and will force the pistons 14 and 15 to the right, as shown, so as to cause the piston 14 to close the passage-way 12, that leads into the compartment 5 of the main casing, and cause the piston 15 to uncover the passage-way 11, that leads into the compartment 4. Air under pressure will then pass directly from the inlet-cylinder 8 by passage-way 11 into chamber or compartment 4 and upon the top of the body of liquid (preferably oil or water) that will be contained within said compartment. The pressure of air upon the top of the body of liquid within the compartment 4 will cause the liquid to pass downward through discharge-valves *i i* into the chambered base *a*, whence it will be forced through the inlet pipe or chute *f* against the blades or buckets of the power-wheel *d*, and thence it will pass to the opposite side of the diaphragm *b*, that divides the base *a*, thence up through the inlet-ports *m m* into the chamber or compartment 5 of the main casing. At the time that liquid is thus passing from compartment 4 of the main casing through the base *a* and into compartment 5 the inlet-valves *s s* of compartment 4 will be locked and the inlet-valves *s s* of compartment 5 will be unlocked and free to rise under the pressure of liquid, this locking and unlocking of the inlet-valves being effected in the following manner: The pressure of liquid within the compartment 4 passing through the tubular stem of the diaphragm-chamber *z* will force outward the diaphragm *y*, as shown in Fig. III of the drawings, and as the diaphragm is thus forced outward it will shift the plate *v*, so that the dependent arms *u* of this plate shall come over the top of the tubular stems *t* of the valves *s s*, thereby holding these valves against upward movement. At the same time air under pressure will pass from the pipe 53 into the diaphragm-chamber *z* (shown at the left-hand side of Fig. III) and will force inward the diaphragm *y*, thereby shifting the plate *v* until its dependent arms *u* no longer engage the stems *t* of the valves *s s*, and these valves are therefore left free to rise under the pressure of liquid passing upward from the base *a*. It will be understood, of course, that as the liquid is thus forced from one compartment of the main casing into the other the power-wheel *d* will be caused to revolve, and the revolution of the shaft *c* of this power-wheel will be transmitted by suitable gearing to the machine to be driven. It is manifest that any suitable form of turbine or power wheel may be employed without departing from the spirit of the invention. When the liquid within the compartment 4 of the main casing descends so far as to permit the float 42 in said compartment to drop, air will pass first around the stem 44 of the float and up around the plunger 32 against the under side of the diaphragm 31, and at the same time a valve 45 will be forced to uncover the port 46. The air passing upward through port 46 and around the plunger 32 will lift the diaphragm 31 against the force of the coil-spring until the shoulder 34 of the plunger rises above and is engaged by the latch 35, which latch will hold the plunger in elevated position. This upward movement of diaphragm 31 and plunger 32 will cause the rod 28 to shift the slide-valve 27 from the position shown at the right-hand side of Fig. II to a position in which the slide-valve 27 shall connect the port 50 with the exhaust-passage 51 of the slide-valve casing 25. As soon as the port 50 is thus brought into communication with the exhaust-passage 51 air will escape from the left-hand end of inlet-cylinder 8 by pipe 55 into the right-hand end of exhaust-cylinder 9, thence by pipe 54, by pipe 53, by port 50, by exhaust-cavity 52 of slide-valve 27, and by exhaust-passage 51 to the atmosphere. Pressure being thus relieved upon the outer face of the piston 14 the spring 19 will shift the pistons 14 and 15, so as to cause the piston 15 to close the channel 11, as shown in Fig. VIII, thereby cutting off admission of air under pressure from the inlet-cylinder to the compartment 4 of the main casing. The air-supply from inlet-cylinder 8 to compartment 4 being thus cut off the air within the compartment 4 will continue to act expansively in expelling the liquid from such compartment, and while the air is thus acting expansively the exhaust-channel 59 will remain open to allow the free escape of air from the compartment 5 of the main casing. It will be understood that the compartment 5 is provided with floats 40 and 42 and coöperating parts corresponding to the parts hereinbefore described, as within the compartment 4, and the same letters of reference therefore are employed upon such parts within the compartment 5. As soon as the liquid rises to the upper part of compartment 5 the float 40 within such compartment will be raised, and as this float is raised it will cause the latch 35 to pass from engagement with the shoulder 34 of the plunger, thereby releasing the plunger 32 and permitting it and the diaphragm 31, attached thereto, to be forced downward by the coil-spring 48 above said diaphragm. This shifting of the float 40 and the downward movement of the plunger 32, &c., in and above the compartment 5 will cause the several parts that are actuated by the float and by the coil-spring 48 to occupy the same relative positions in which the corresponding parts in compartment 4 are shown in Fig. II of the drawings. This downward movement of the diaphragm 31 above compartment 5 will cause the left-hand slide-valve 27 to be shifted from the position shown in Fig. II to a position corresponding to that in which the right-hand slide-valve is shown in Fig. II. The exhaust-port 51 of the left-hand slide-valve casing 26 will thereby be closed, and compressed air will then pass from the inlet-cylinder by pipe 23, thence by the left-hand portion of pipe 24 (see Fig. I) to the left-hand slide-valve casing 26, thence by port 63 to pipe 64, and thence by down-pipe 65 to the left-hand end of the exhaust-cylinder 9. As the air enters the left-hand end of the exhaust-cylinder 9 it will force the pistons 60 and 61 to a position opposite that shown in Fig. III of the drawings, thereby uncovering the pipe 66, through which pipe 66 air will pass to the right-hand end of the inlet-cylinder 8, thereby forcing the pistons 14 and 15 within the cylinder 8 to occupy a position opposite that shown in Fig. II of the drawings, the piston 14 at such time uncovering the channel 12 for passage of air to the compartment 5, while the piston 15 prevents the passage of air through the channel 11 to the compartment 4 of the main casing.

It will be seen by reference to Fig. I that a by-pass pipe 67 connects the pipe 66 with the exhaust-cylinder 9, the purpose of this pipe being the same as that of the by-pass pipe 56. By reference to Fig. III it will be seen that when the pistons 60 and 61 are shifted by admission of air to the left-hand end of the exhaust-cylinder 9 the by-pass pipe 56 will be open and air will then escape from the left-hand end of the inlet-cylinder 8 by pipe 55 and by-pass pipe 56 into the exhaust-cylinder, whence it will pass by exhaust-pipe 57 to the atmosphere. This exhaust of air from the left-hand end of the inlet-cylinder allows the piston 14 to be moved toward the left after the opening of the pipe 55 into the exhaust-cylinder 9 has been closed. When the pistons 14 and 15 of the inlet-cylinder have been shifted to a position opposite that shown in Fig. II of the drawings, air will pass from the inlet-cylinder by a channel 12 into the compartment 5 of the main casing. At the same time air will pass by pipes 65 and 64 across the top of the main casing and down to the right side thereof into the diaphragm-chamber $z$ and will force inward the diaphragm $y$ at the side of the compartment 4 of the main casing, thereby causing the lock-plate $v$ to be shifted so that the dependent arms $u$ of this lock-plate shall pass from above the tubular stems $t$ of the inlet-valves $s\ s$. The pressure of air now exerted upon the top of the liquid in the compartment 5 of the main casing will cause the liquid to force outward the diaphragm $y$ at the side of the compartment 5 of the main casing, thereby causing the lock-plate $v$ within the compartment 5 to move to the left, so that its dependent arms $u\ u$ shall come above the tubular stems $t$ of the corresponding inlet-valves $s\ s$ and hold these valves against upward movement. The pressure of air admitted to the top of the compartment 5 will cause the outlet valves $j\ j$ at the bottom of compartment 5 to open downward, and the liquid will then pass from the compartment 5 into the base $a$ and will pass thence through the pipe or nozzle $f$ against the blades or buckets of the power-wheel $d$. The liquid will then pass through the diaphragm of the base $a$ and thence up through the inlet-ports $k$ into the compartment 4 of the main casing, the inlet-valves $s\ s$ being lifted by the force of the liquid. This flow of the liquid from compartment 5 through the base $a$ and into compartment 4 of the main casing will continue until the float 40 in compartment 4 is raised, so as to cause the catch 35 to release the shoulder 34 of the plunger 32, allowing this plunger to be forced downward by the coil-spring 48 above it. The floats 40 and 42 in each of the compartments 4 and 5 of the main casing are shown as bottomless floats, the purpose of this construction being to prevent the collapsing of the floats under the pressure within the compartments. It will be understood that compressed air will continue to pass from inlet-cylinder 8 by channel 12 to compartment 5, as above described, until the float 42 within compartment 5 descends and allows air to pass up around the plunger 32 at the top of the compartment 5 and against the corresponding diaphragm 31. This pressure of air against said diaphragm 31 will shift the left-hand slide-valve 27 from the position shown in Fig. 2 of the drawings, thereby allowing the escape of air through the exhaust-cavity 52 of the left-hand slide-valve 27 from port 63 and pipes connected therewith to the exhaust-port 51 and to the atmosphere. When the port 63 and exhaust-port 51 are thus brought into communication by the left-hand slide-valve 27, air will pass from the right-hand end of the inlet-cylinder 8 by pipe 66 into the left-hand end of the exhaust-cylinder 9, (see Fig. I,) whence it will pass by vertical pipe 65 and pipe 64 to port 63, and thence by exhaust-port 51 to the atmosphere. Air-pressure being thus relieved at the right-hand end of the inlet-cylinder 8, the coil-spring 19 within this cylinder will force the pistons 14 and 15 to assume the neutral position shown in Fig. VIII, and the admission of air from the inlet-cylinder 8 to the compartment 5 will then be cut off. The compressed air within the compartment 5 will, however, continue to act expansively in expelling the liquid from compartment 5, as hereinbefore described. When the liquid rises sufficiently in compartment 4 to cause the float 40 to withdraw the catch 35 from engagement with the shoulder 34 of the plunger 32 within compartment 4 of the main casing, the right-hand slide-valve 27 will be shifted to the position shown in Fig. II, thereby admitting air, as hereinbefore described, by pipes 53 and 54 to the right-hand end of the exhaust-cylinder 9, (see Fig. III,) so as to shift the pistons 60 and 61 toward the left, thus closing the end of the pipe 66; but as these pistons 60 and 61 are shifted toward the left the by-pass pipe 67 is uncovered and air will then continue to exhaust from the right-hand end of inlet-cylinder 8 through pipe 66 and by-pass pipe 67 into the exhaust-cylinder 9, whence it will pass by exhaust-pipe 57 to the atmosphere. All back pressure within the inlet-cylinder 8 is thus guarded against.

From the foregoing description it will be seen that the same volume of liquid is alternately forced from one compartment of the main casing into the other and during its passage back and forth causes a continuous movement in the same direction of the power-wheel $d$. For convenience the power-wheel is shown as located within the base $a$; but manifestly the power-wheel could be located in a separate compartment without departing from the spirit of the invention.

In order to insure greater uniformity of action of the liquid upon the power-wheel, particularly after the supply of compressed air to the compartments has been cut off, I prefer to provide one or more supplemental chambers or reservoirs 70, that communicate by port 71 (see Figs. II, IV, and V) with the chambered base $a$. Preferably these supplemental chambers or reservoirs 70 are cast in piece with the body 2 of the main casing, the lower part of the chambers 70 being formed by lateral extensions of the side walls of the base-chamber $a$. Hence it will be seen that when liquid is being expelled from one compartment into the base-chamber a certain amount of liquid will rise into the supplemental reservoirs 70, thereby compressing the air therein, and when the supply of compressed air is cut off, as hereinbefore described, the expansion of the air within the supplemental reservoirs will cause the liquid therein to descend, and thus insure a more uniform revolution of the power-wheel $d$.

It is manifest that instead of water oil or other fluid might be used for imparting movement to the power-wheel or other motor. By my invention a continuous revolution of the power-wheel and its shaft is insured and the necessity for expensive stuffing-boxes or the like is avoided. It will be understood, of course, that the machine to be driven—such, for example, as a motor-vehicle—will be suitably geared with the power-shaft of the motor-wheel; but inasmuch as the gearing forms no part of my present invention it has not been thought necessary to illustrate it in the accompanying drawings.

Having thus described my invention, what I claim as new, and desire to secure by Letters Patent, is—

1. An apparatus of the character described, comprising the combination of two compartments for holding fluid under pressure, a chamber also for holding fluid under pressure intermediate said compartments and provided with ports opening directly into the latter, channels for the admission and exhaust of air or gas under pressure to and from each of said compartments, to force the liquid therein back and forth between said compartments and said intermediate chamber, a pressure-motor in said intermediate chamber to receive the force of the liquid as it is expelled from either of said compartments through said intermediate chamber and into the other of said compartments, suitable valve mechanism for controlling admission or exhaust of air or gas to and from each of said compartments, and valves for the ports between said compartments and said intermediate chamber for controlling the flow of liquid between said compartments and chamber.

2. An apparatus of the character described, comprising the combination of two compartments for holding fluid under pressure, a chamber also for holding fluid under pressure divided into opposite sides by a partition and provided at each of its opposite sides with inlet and discharge ports opening into one of said compartments, channels for the admission and exhaust of air or gas under pressure to and from each of said compartments, to force the liquid therein back and forth between said compartments and through said intermediate chamber, a pressure-motor between the opposite sides of said intermediate chamber to receive the force of the liquid as it is expelled from either of said compartments through said chamber into the other of said compartments, suitable valve mechanism for controlling the alternate admission and exhaust of air or gas to and from each of said compartments, and valves in said ports between said compartments and said intermediate chamber for controlling the flow of liquid between said compartments and chamber.

3. An apparatus of the character described, comprising the combination of plural compartments for holding liquid under pressure, channels for the admission and discharge of air or gas under pressure to said compartments, valve mechanism for controlling the alternate admission and escape of air or gas to said compartments, a motor for receiving the force of liquid as it is expelled from said compartments, a chamber wherein said motor is contained, inlet and discharge ports and valves between said compartments and said motor-chamber, mechanism for locking the inlet-valves of each chamber during the time that the liquid is being expelled therefrom, said locking mechanism comprising diaphragm-chambers connected on one side with the liquid-holding compartments and upon the opposite side with the air-supply, and diaphragms within said diaphragm-chambers connected to said locking mechanism.

4. An apparatus of the character described, comprising the combination of plural compartments for holding liquid under pressure, channels for admitting air or other gas under pressure to said compartments, valve mechanism for controlling the admission and discharge of air through said channels to said compartments, a motor for receiving the force of the liquid as it is expelled from said compartments, a chamber wherein said motor is located, inlet and discharge ports and valves between said compartments and said motor-chamber, latch mechanism for locking the air-controlling mechanism in position, floats within each of said compartments serving to unlock said air-controlling valve mechanism, and means serving to effect the shift of said air-controlling valve mechanism.

5. An apparatus of the character described, comprising the combination of plural compartments for holding liquid under pressure, channels for admitting air or other gas under pressure to said compartments, valve mechanism for controlling the admission and discharge of air through said channels to said compartments, a motor for receiving the force of the liquid as it is expelled from said compartments, a chamber wherein said motor is located, inlet and discharge ports and valves between said compartments and said motor-chamber, locking mechanism within said compartments for holding the air-controlling valve mechanism in position and plural floats within each of said compartments, one of the floats within each compartment serving to effect the shift of the air-controlling valve mechanism and the other of said floats within each compartment serving to unlock said air-controlling valve mechanism.

6. An apparatus of the character described, comprising the combination of plural compartments for holding liquid under pressure, channels for admitting air or other gas under pressure to said compartments, a movable valve and valve-casing for each compartment and whereby the admission and discharge of air to and from said compartments are controlled, a spring-actuated plunger connected with each of said air-controlling valves, lock mechanism for engaging said plunger, a float within each compartment for controlling the corresponding lock mechanism, a diaphragm-chamber and a diaphragm therein connected to said plunger and in communication with its corresponding compartment, a float and valve for controlling the admission of air to the corresponding diaphragm-chamber, a motor for receiving the force of the liquid as it is expelled from said compartments, a chamber wherein said motor is located and inlet and discharge ports and valves between said compartments and said motor-chamber.

7. An apparatus of the character described, comprising the combination of plural compartments for holding fluid under pressure, channels for the admission and discharge of gas or air under pressure to and from said compartments, valve mechanism for controlling the alternate admission and discharge of air or gas to and from said compartments comprising an individual movable valve for each compartment, a spring-actuated diaphragm connected with each of said valves, a chamber for said diaphragm connected with the interior of the corresponding compartment, a plunger leading from said diaphragm into said compartment, a latch for engaging said plunger when it is forced outward, a float for effecting the release of said latch, a valve for controlling the admission of air or gas from said compartment to said diaphragm-casing, a float within said compartment for controlling said valve, a motor for receiving the force of liquid as it is expelled from said compartments, a chamber wherein said motor is contained, and inlet and discharge ports and valves between said compartments and said motor-chamber.

8. An apparatus of the character described, comprising the combination of plural compartments for holding fluid under pressure, channels for the admission and escape of air or gas under pressure to and from said compartments, a motor for receiving the force of the fluid as it is expelled from said compartments, a chamber for said motor, suitable ports and valves intermediate said compartments and said motor-chamber, valve mechanism for controlling the alternate admission of air or gas to said compartments comprising an inlet-cylinder having pistons therein for controlling the channels that admit air to said compartments, an exhaust-cylinder having pistons for controlling the channels through which air escapes from said compartments and supplemental valve mechanism for controlling the admission of air to and from said inlet and exhaust cylinders and means within each of said compartments for actuating said supplemental valve mechanism.

9. An apparatus of the character described comprising the combination of plural compartments for holding fluid under pressure, channels for the admission and escape of air or gas under pressure to and from said compartments, a motor for receiving the force of the fluid as it is expelled from said compartments, a chamber for said motor, suitable ports and valves intermediate said compartments and said motor-chamber, valve mechanism for controlling the alternate admission of air or gas to said compartments comprising an inlet-cylinder having pistons therein for controlling the channels that admit air to said compartments, a spring for effecting the shift of said pistons to cause it to close said admission-channels, an exhaust-cylinder having pistons for controlling the channels through which air escapes from said compartments and supplemental valve mechanism for controlling the admission of air to and from said inlet and exhaust cylinders and means within each of said compartments for actuating said supplemental valve mechanism.

10. An apparatus of the character described, comprising the combination of plural compartments for holding fluid under pressure, channels for the admission and escape of air or gas under pressure to and from said compartments, a motor for receiving the force of the fluid as it is expelled from said compartments, a chamber for said motor, suitable ports and valves intermediate said compartments and said motor-chamber, valve mechanism for controlling the alternate admission of air or gas to said compartments comprising an inlet-cylinder having pistons therein for controlling the channels that admit air to said compartments, a spring within said inlet-cylinder, a stationary casing for holding said spring also within said cylinder, means whereby the pistons may oppositely compress said spring, said spring serving to cause the pistons to close the inlet-channels, an exhaust-cylinder having pistons for controlling the channels through which air escapes from said compartments and supplemental valve mechanism for controlling the admission of air to and from said inlet and exhaust cylinders and means within each of said compartments for actuating said supplemental valve mechanism.

11. An apparatus of the character described, comprising the combination of plural compartments for holding fluid under pressure, channels for the admission and escape of air or gas under pressure to and from said compartments, a motor for receiving the force of the fluid as it is expelled from said compartments, a chamber for said motor, suitable ports and valves intermediate said compartments and said motor-chamber, valve mechanism for controlling the alternate admission of air or gas to said compartments comprising an inlet-cylinder having pistons therein for controlling the channels that admit air to said compartments, an exhaust-cylinder having pistons for controlling the channels through which air escapes from said compartments, suitable pipes connecting said inlet and said exhaust cylinders whereby air is delivered from the inlet-cylinder to the exhaust-cylinder to shift the pistons of said latter cylinder.

12. An apparatus of the character described, comprising the combination of plural compartments for holding fluid under pressure, channels for the admission and escape of air or gas under pressure to and from said compartments, a motor for receiving the force of the fluid as it is expelled from said compartments, a chamber for said motor, suitable ports and valves intermediate said compartments and said motor-chamber, valve mechanism for controlling the alternate admission of air or gas to said compartments comprising an inlet-cylinder having pistons therein for controlling the channels that admit air to said compartments, an exhaust-cylinder having pistons for controlling the channels through which air escapes from said compartments and supplemental valve mechanism for controlling the admission of air to and from said inlet and exhaust cylinders comprising valve-chambers having ports communicating with the atmosphere, pipes connecting said chambers with the exhaust-cylinder, and means within each of said compartments for actuating said supplemental valve mechanism.

13. An apparatus of the character described, comprising the combination of plural compartments for holding fluid under pressure, channels for the admission and escape of air or gas under pressure to and from said compartments, a motor for receiving the force of the fluid as it is expelled from said compartments, a chamber for said motor, suitable ports and valves intermediate said compartments and said motor-chamber, valve mechanism for controlling the alternate admission of air or gas to said compartments comprising an inlet-cylinder having pistons therein for controlling the channels that admit air to said compartments, spring mechanism within said inlet-cylinder for effecting the cut-off of the air-supply through said channels to admit air to said compartments, an exhaust-cylinder having pistons for controlling the channels through which air escapes from said compartments, pipes connecting the opposite ends of said inlet and exhaust cylinders, supplemental valve mechanism for controlling the admission of air to and from said inlet and exhaust cylinders comprising valve-casings and valves therein, said valve-casings having ports leading to the atmosphere and pipes connecting said valve-casings with the inlet-cylinder, and means within each of said compartments for actuating said valves.

ROBERT H. LITTLE.

Witnesses:
GEO. P. FISHER, Jr.,
ALBERTA ADAMICK.